United States Patent [19]

Takahashi

[11] Patent Number: 5,136,681
[45] Date of Patent: Aug. 4, 1992

[54] OPTICAL POWDER ATTENUATOR OF VARIABLE ATTENUATION TYPE

[75] Inventor: Mitsuo Takahashi, Matsudo, Japan
[73] Assignee: Seikoh Giken Co., Ltd., Matsudo, Japan
[21] Appl. No.: 727,534
[22] Filed: Jul. 9, 1991
[51] Int. Cl.⁵ ............................................. G02B 6/38
[52] U.S. Cl. ....................................... 385/40; 385/60; 385/66; 385/73
[58] Field of Search ............... 350/96.10, 96.15, 96.20, 350/96.21, 96.18; 385/56, 58, 60, 62, 66, 70, 72, 78, 81, 84, 25, 140, 73

[56] References Cited

U.S. PATENT DOCUMENTS

| | | | |
|---|---|---|---|
| 4,666,243 | 5/1987 | Rogstadius et al. | 350/96.21 |
| 4,787,700 | 11/1988 | Yin | 350/96.21 |
| 4,856,865 | 8/1989 | Lee | 350/96.21 |
| 4,893,889 | 1/1990 | Iwakiri et al. | 350/96.15 |
| 4,900,124 | 2/1990 | Lambert et al. | 350/96.21 |
| 4,953,941 | 9/1990 | Takahashi | 385/72 |
| 4,986,627 | 1/1991 | Boscher et al. | 350/96.21 |
| 5,050,956 | 9/1991 | Carpenter et al. | 385/140 |
| 5,066,094 | 11/1991 | Takahashi | 385/73 |
| 5,082,345 | 1/1992 | Cammons et al. | 385/60 |

*Primary Examiner*—Brian Healy
*Attorney, Agent, or Firm*—Spencer, Frank & Schneider

[57] ABSTRACT

A new type of optical power attenuator of the variable attenuation type. The optical connector ferrule edges are finished by polishing them at an inclination angle of seven to 12 degrees with respect to the optical axis thereof, and both ferrule edges face each other with a gap therebetween. One of the ferrule edges is fastened not so that it can be rotated whereas the other can be rotated around its optical axis. The attenuation is determined by both the inclination and gap, and it can be set stably by adjustment of the angle of the rotation around the optical axis of the ferrules.

5 Claims, 4 Drawing Sheets

F I G. 6
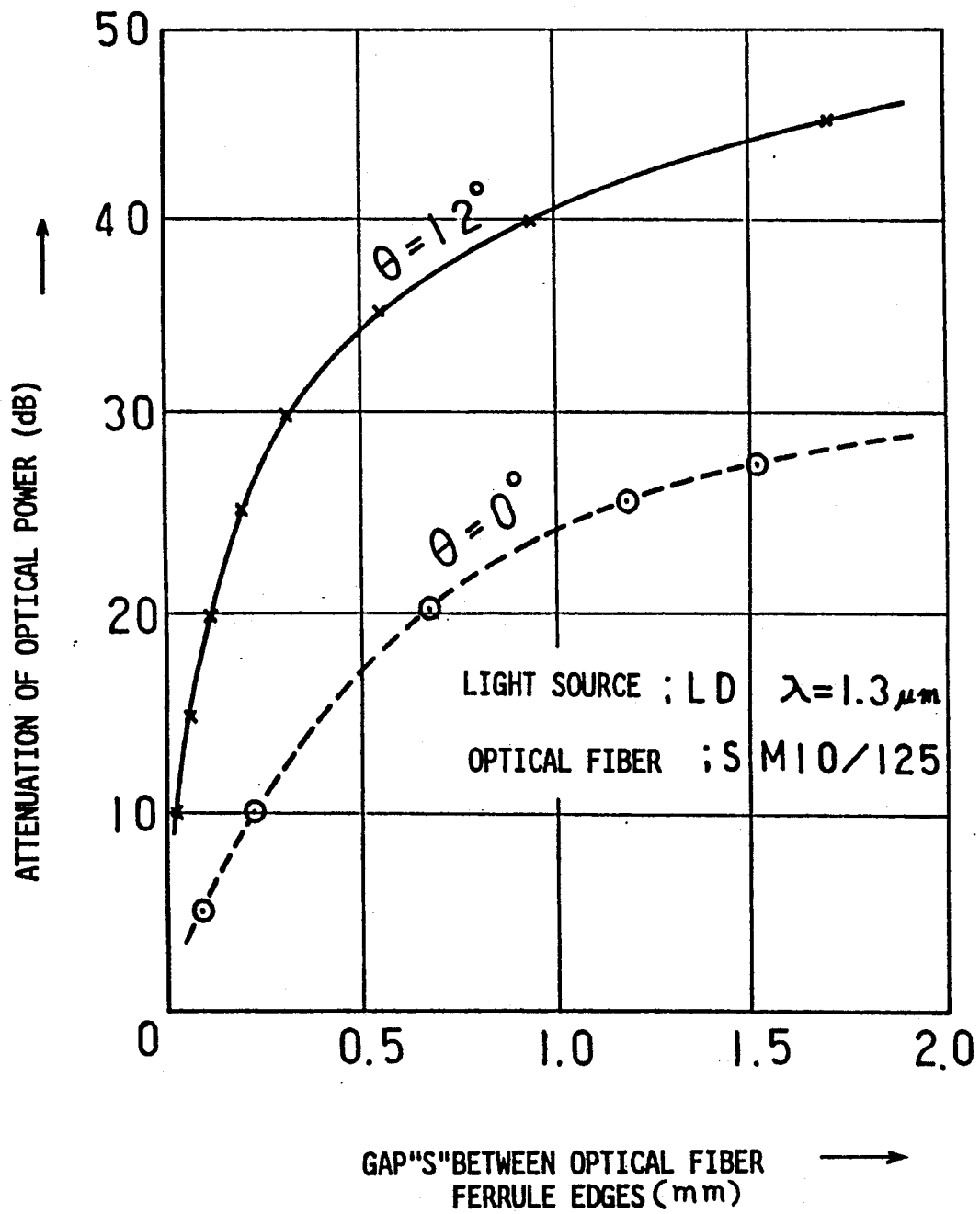

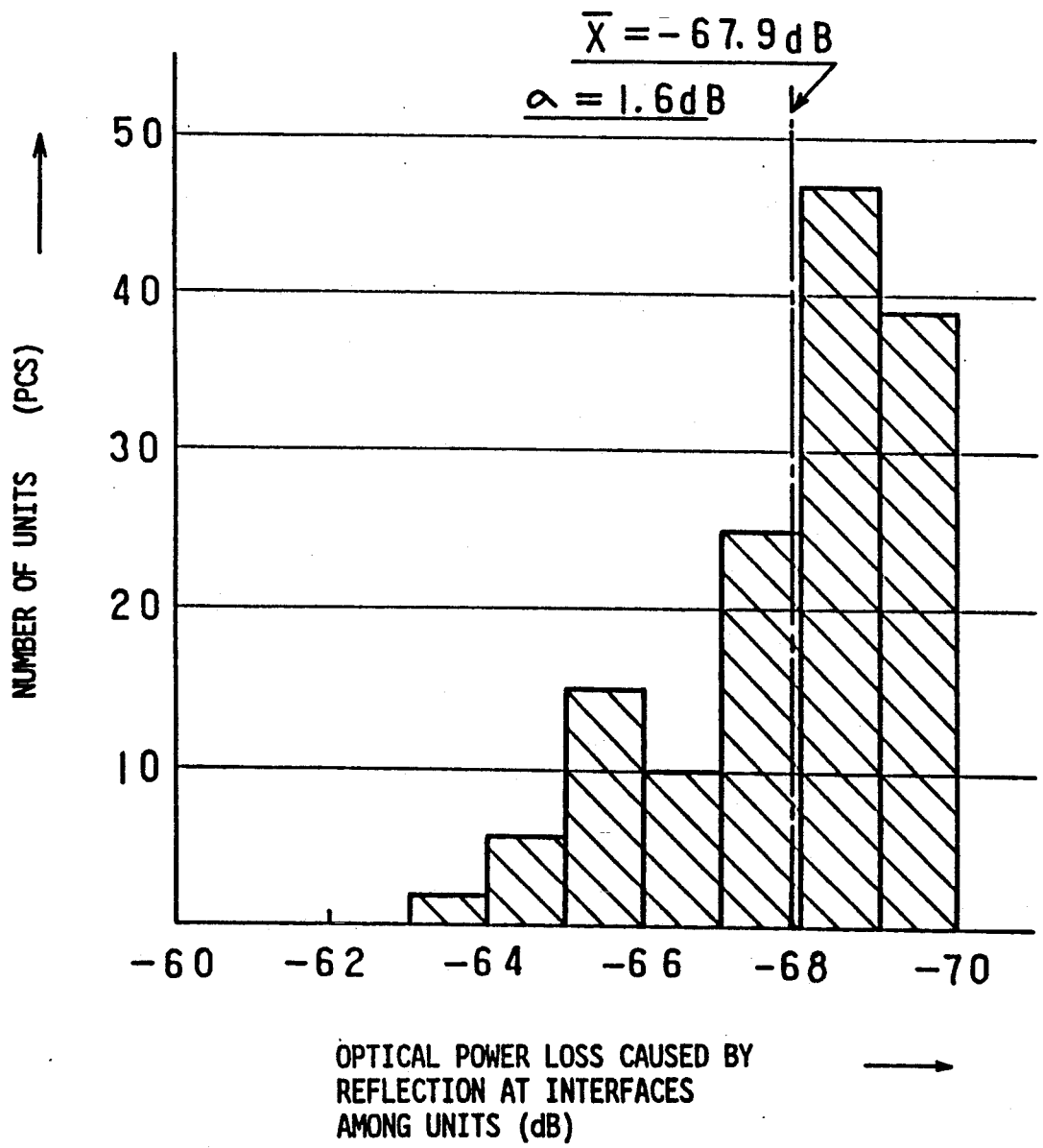

OPTICAL POWDER ATTENUATOR OF VARIABLE ATTENUATION TYPE

BACKGROUND OF THE INVENTION

The present invention relates to an optical attenuator of the variable attenuation type which is used to continuously adjust the attenuation of optical power transmitted through the optical attenuator, and especially to a high-performance optical attenuator of the variable attenuation type wherein unwanted optical power loss caused by reflection of optical power at the interface between a pair of optical fibers can be minimized.

Various types of optical attenuators of the variable attenuation type have been proposed and put into practical use so as to adjust the attenuation of optical power in optical fiber communication circuits.

FIG. 1 shows a side view of a conventional optical attenuator of the variable attenuation type, wherein a glass plate whose transmittance continuously changes with the angle of rotation is arranged in-between a pair of rod lenses.

A pair of rod lenses 1, 2 are arranged in an optical power transmission path 4, and a glass plate whereon a metal film is deposited so that the transmittance gradually changes with the angle of rotation is arranged in-between the pair of rod lenses 1,2.

If glass plate 3 is shifted along the optical axis or revolved around the optical axis by using an adjuster (not shown) while glass plate 3 is facing the plane perpendicular to the optical axis, the optical power along optical power transmission path 4 can be set at an arbitrary value corresponding to a specific position on glass plate 3.

The optical power reflects on the surfaces of rod lenses 1 and 2 (or at the interfaces between the air media and lens surfaces) and also at the interfaces between the air media and glass plate surfaces where a metal or metals are evaporated.

The optical power reflected from these interfaces, which is incident on the optical source, unless disregarded, affects the operation of the optical source.

The coefficient of optical power transmission for glass plate 3 in this device changes with elapsing time and this change makes the attenuation unstable.

Unlike the aforementioned method, it is also known by the person skilled in the art that the optical power can be attenuated and set at an arbitrary value which is equal to or smaller than the incident optical power by changing the distance between the tips of the optical connectors which mate together.

FIG. 2 is a cross-sectional view of an example of an optical attenuator which can continuously attenuate optical power in such a manner that the distance between the edges of ferrules which mate together is changed by an adjuster in the connector structure.

The inventor of the present invention filed U.S. Ser. No. 07/274,184, now U.S. Pat. No. 4,953,941 issued Sep. 4, 1990, for a connector structure for adjusting the distance between the edges of optical connectors as shown in FIG. 2.

Alignment adapter 5 which is finished by machine work is a cylinder made of a metal. Alignment adapter 5 has a through-hole 20 into which ferrules 14 and 15 can be inserted at the center thereof, and has an opening at one end whose inner surface provides screw 22 which mate with adjusting or setscrew nut 21.

Screws 12 and 13 which can mate with coupling nuts 8 and 9 of optical connector plugs 6 and 7 are provided on the outer surface of alignment adapter 5 at both ends thereof.

Screws 12 and 13 provide key grooves 18 and 19 which can mate with keys 16 and 17 which are arranged on the outer surfaces of ferrules 14 and 15 of optical connector plugs 6 and 7 so that ferrules 14 and 15 of optical connector plugs 6 and 7 are protected against rotating around the optical axes thereof.

Coil spring 23 is installed in a space between coupling nut 8 and ferrule 14, and coil spring 23 is installed in a space between coupling nut 9 and ferrule 15. Thus, ferrules 14 and 15 are pushed toward the edges of alignment adapter 5.

Stop rings 24 and 25 are inserted into grooves 26 and 27 of ferrules 14 and 15, respectively.

Groove 28 is provided in one side of setscrew nut 21 so as to turn setscrew nut 21 clockwise or counterclockwise.

How to adjust the attenuation of the optical attenuator of the variable attenuation type will be described briefly hereinafter.

Optical connector plugs 6 and 7, and setscrew nut 21 have been fastened to alignment adapter 5 as shown in FIG. 2. Optical fiber 29 is connected to an optical source (not shown), and optical fiber 30 is connected to an optical powermeter (not shown).

Arbitrarily set gap S between a pair of ferrule edges by adjusting the position of setscrew nut 21, set optical connector plug 7 in position, and measure the attenuation of the optical attenuator. If the attenuation is improper, repeat the above operations to alter gap S between a pair of ferrule edges until the attenuation becomes the desired value.

The operations to set the attenuation at a specified value is not easy and troublesome in this type of variable attenuator.

In addition, the optical power loss due to the reflection of optical power at the interfaces between the ferrule edges and air media is as large as 10 to 12 dB. This type of variable attenuator cannot be used for transmitting a large amount of digital information to a distant place, or for transmitting video signals to a distant place.

The objective of the present invention is to present a new type of optical attenuator of the variable attenuation type wherein the optical power loss due to the reflection of optical power at the interfaces between the ferrule edges and air media is reduced, the attenuation can easily be set at a specified value, and wherein a structure which permits easy connection of optical fibers thereto is employed.

SUMMARY OF THE INVENTION

The optical attenuator of the variable attenuation type built in accordance with this invention provides a pair of ferrules with a pair of optical fibers passing through the respective through-holes at the center thereof wherein the ferrule edges are finished by polishing the edge surfaces thereof to be inclined at 7 to 20 degrees with respect to a plane orthogonal to the optical axis of the ferrules, the ferrule edges are pushed toward each other by a coil spring, and the distance between the pair of optical fibers is altered when one ferrule rotates around the optical axis thereof in the range of 0 to 180 degrees with the other ferrule fastened on the same optical axis.

This type of optical attenuator of the variable attenuation type allows its mechanism to provide an arbitrary quantity of attenuation in optical powers transmitted from one optical fiber to the other optical fiber with a pair of ferrules kept attached to the adapters of the connectors.

The optical attenuator of the variable attenuation type built in accordance with the present invention, wherein the optical power transmitted from an optical fiber arranged in one side thereof is attenuated by a specified amount of attenuation and then transmitted to the other optical fiber arranged in the other side to be coupled to the first optical fiber, consists of an alignment adapter; a first ferrule wherein the transmission edge surface where the optical fiber edge is exposed to the air media is inclined by a predetermined angle with respect to the optical axis thereof; a first fastening means to support the first ferrule to the alignment adapter so as to protect the first ferrule against rotating around the optical axis of the first ferrule; a second ferrule wherein the transmission edge surface where the optical fiber edge is exposed to the air media is inclined by the same angle as the first ferrule with respect to the optical axis of the second ferrule; and a pair of optical fiber connectors, each of which is provided to couple with the alignment adapter, to force the second ferrule to the first ferrule by a coil spring, and to fasten the second ferrule to the alignment adapter so that the second ferrule rotates aroung the optical axis of the first ferrule at an angle in a predetermined range where the second ferrule is concentrically revolvable around the optical axis of the first ferrule.

The alignment adapter provides a pair of alignment sleeve holes which precisely mate with the outer diameters of the first and second ferrules, and it allows the second ferrule to rotate around the optical axes of the first and second ferrules.

The edge surfaces of a pair of ferrules are finished by polishing them so that the each surface is at 7 to 20 degrees with respect to the plane perpendicular to the optical axis of the optical fiber.

The optical fiber connector consists of a holder to support the second ferrule so as to protect the second ferrule against shifting toward the optical axis of the second ferrule, to allow the second ferrule to rotate around the optical axis of the second ferrule, and to guide the alignment adapter to the optical axis of the second ferrule; a coupling nut to support the holder by a through-hole at the bottom of the optical fiber connector plug and to couple with the alignment adapter via the opening of the through-hole; and spring means which is inserted in a space between the coupling nut and the holder so as to force the second ferrule to the first ferrule via the holder.

The first fastening means to support the first ferrule to the alignment adapter so as to protect the first ferrule against rotating around the optical axis of the first ferrule can be actualized by using an optical fiber connector which employs the same structure as the first optical fiber connector.

The second ferrule is revolvable around the optical axis thereof by an arbitrary angle within 180 degrees with respect to the alignment adapter, thereby keeping the distance between a pair of the ferrule edge surfaces at an arbitrary value between the maximum where the difference in the angle of the inclination between the pair of ferrules becomes the greatest value and the minimum where the ferrule edge surfaces are arranged in the closest position, and thereby causing the attenuation of the optical power to continuously change.

The second ferrule can be revolved with respect to the first ferrule around the optical axes of the first and second ferrules by such an angle that the desired optical power attenuation can be obtained, and fastened there so that the desired optical power attenuation is stably kept obtained.

BRIEF DESCRIPTION OF THE DRAWINGS

FIG. 6 is a graph showing optical power attenuation by the optical attenuator according to the present invention obtained experimentally in terms of the gap S between the edges of a pair of optical fibers.

FIG. 7 is a histogram of the optical power loss caused by a number of optical power attenuators of the variable attenuation type according to the present invention which are connected in series.

DESCRIPTION OF THE PREFERRED EMBODIMENT OF THE INVNETION

The present invention will be described in further detail referring to FIGS. 3–5 of the attached drawings.

The optical power attenuator of the variable attenuation type according to the present invention attenuates by a predetermined quantity the optical power which enters from an optical fiber 33, and sends the attenuated power to an optical fiber 34. Contrarily, it can attenuate optical power which enters from optical fiber 34, and can send the attenuated power to optical fiber 33.

Figure 3:
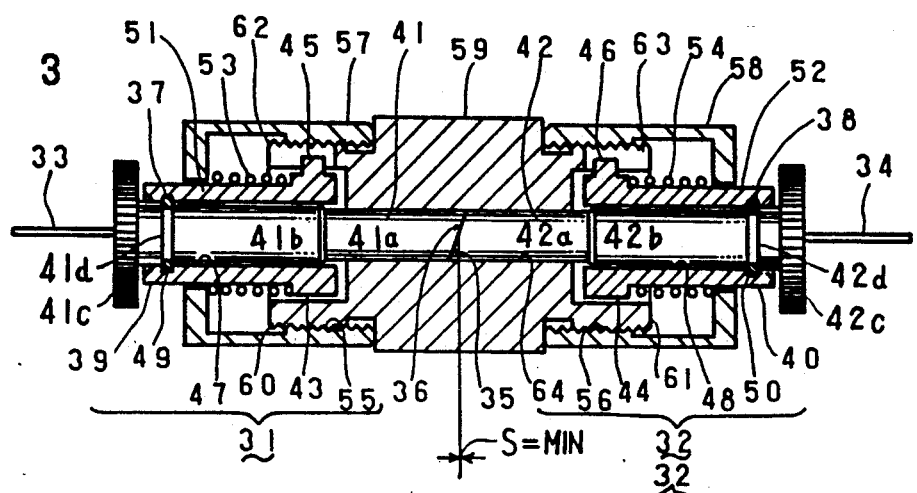
FIG. 3 is a cross-sectional view of an embodiment of the optical power attenuator of the variable attenuation type according to the present invention, wherein the attenuation is set at minimum.

The optical attenuator of the variable attenuation type shown in FIG. 3 consists of a first optical connector plug 31 which is shown on the left of FIG. 3, alignment adapter 59, and second optical connector plug 32 which is shown to the right of alignment adapter 59.

Alignment adapter 59 has a hole 64 therethrough at the center thereof, and threaded screw portions 60 and 61 at both ends thereof. Screw portions 60 and 61 are provided with key grooves 62 and 63, respectively.

First ferrule 41 consists of a small-diameter cylinder 41a which can mate with alignment adapter 59, and a larger-diameter cylinder 41b which can mate with a holder 51, and a knob 41c. Cylinder 41b has a groove 41d around the outer surface thereof.

A second ferrule 42 consists of a small-diameter cylinder 42a, a larger-diameter cylinder 42b, and a knob 42c. Cylinder 42b has a groove 42d around the outer surface thereof.

First holder 51 has a through-hole 47 therein which can receive cylinder 41b of the first ferrule 41 so that cylinder 41b can rotate around the optical axis of the first ferrule 41. A groove 49 is provided on the inner surface of hole 47 in a position such that groove 49 can mate with groove 41d of the first ferrule 41, and a stop ring 37 is inserted into the space between grooves 41d and 49. Thus, first ferrule 41 is supported within first holder 51 so that first ferrule 41 can be rotated around the optical axis thereof although it is protected against shifting along the optical axis thereof.

Holder 51 has a flange 43 around the outer surface thereof in the rightmost position thereof. Flange 43 includes a stop key 45 to which prevents holder 51 from rotating around the optical axis of first ferrule 41 because key 45 mates with key groove 62 of the alignment adapter 59.

A second holder 52 has a through-hole 48 therein which can receive cylinder 42b of the first ferrule 42 so that cylinder 42b can rotate around the optical axis of the second ferrule 42. A groove 50 is provided on the inner surface of hole 48 in a position such that groove 50 can mate with groove 42d of the second ferrule 42, and a stop ring 38 is inserted into the space between grooves 42d and 50.

Holder 52 has a flange 44 around the outer surface thereof in the leftmost position. Flange 44 includes a stop key 46 which prevents holder 52 from rotating around the optical axis of second ferrule 42 because key 46 mates with key groove 63 of the alignment adapter 59.

A first coupling nut 57 is of the cap nut type wherein a through-hole at an end thereof accepts the holder 51 with a very small gap between the hole and holder 51. First coupling nut 57 has a threaded screw portion 55 on the inner surface of the opening thereof so that threaded portion can mate with threaded screw 60 of the alignment adapter 59. A coil spring 53 is inserted into a space between flange 43 of the first holder 51 and the first coupling nut 57, and it forces the first ferrule 41 to the alignment adapter 59 via first holder 51.

A second coupling nut 58 is such that another through-hole at an end thereof accepts the holder 52 with a very small gap between the hole and holder 52. Second coupling nut 58 has a threaded screw portion 56 on the inner surface of the opening thereof so that threaded screw 56 portion can mate with threaded screw 61 portions of the alignment adapter 59.

A coil spring 54 is inserted into a space between flange 44 of the second holder 52 and the second coupling nut 58, and it forces the second ferrule 42 to the alignment adapter 59 via second holder 52.

How to adjust the mechanism for obtaining the desired optical power attenuation will be described briefly hereinafter.

Parts are assembled as shown in FIG. 3 wherein optical fiber 33 is connected to an optical power source (not shown) and optical fiber 34 is connected to an optical powermeter (not shown).

Optical connector plug 31 which is fastened to alignment adapter 59 so that ferrule 41 cannot rotate around the optical axis thereof is not adjustable and ferrule 41 is fastened to holder 51 with an adhesive agent.

If the operator revolves knob 42c of ferrule 42 while reading the attenuation on knob 42c until the reading becomes the desired value, ferrule 42 can be revolved around the optical axis thereof by a predetermined angle within 180 degrees.

When the attenuation becomes the desired value, an adhesive agent which can be cured instantaneously after being exposed to the air is poured into the gap between ferrule 42 and holder 52.

After ferrule 42 is fastened to holder 52 via an adhesive agent, the second coupling nut 58 can be loosened and optical connector plug 31 which can be revolved by a manual operation can be removed. Since second ferrule 42 is accurately set at both a predetermined angle and distance with respect to first ferrule 41 so that the distance between the pair of optical fibers is of a predetermined value after operations to attach/detach the ferrules are repeated, the attenuation which has been set before cannot change after the readjustment.

In FIG. 6, the optical power attenuation is obtained experimentally in terms of gap S between the edges of the pair of optical fibers for the optical attenuator of the variable attenuation type. In the solid line of FIG. 6, the ferrule edge surfaces 35, 36 in the optical attenuator of the variable attenuation type built in accordance with this invention are set at 12 degrees (referred to as $\theta = 12°$) with respect to a plane perpendicular to the optical axis of the ferrules, and the distance S between the pair of optical fibers is changed to alter the optical power attenuation.

The distance between the pair of optical fibers in the aforementioned structure can be altered continuously by revolving the second ferrule knob.

Figure 4:
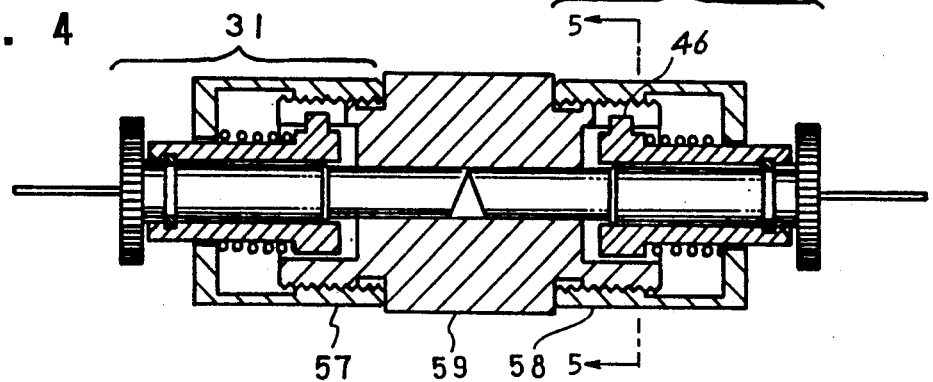
FIG. 4 is a cross-sectional view of the embodiment of the optical power attenuator of FIG. 3, wherein the attenuation is set at maximum.
Figure 5:
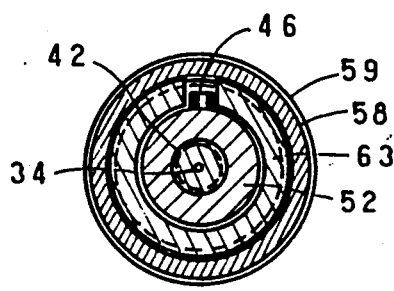
FIG. 5 is a cutaway view of the embodiment of the optical attenuator of FIG. 4, wherein the optical power attenuator is cut along the line 5—5 in FIG. 4.

In FIG. 4, the second ferrule 42 is set at 180 degrees with respect to the first ferrule 41 so that the distance S between the pair of optical fibers is maximized.

Figure 1:
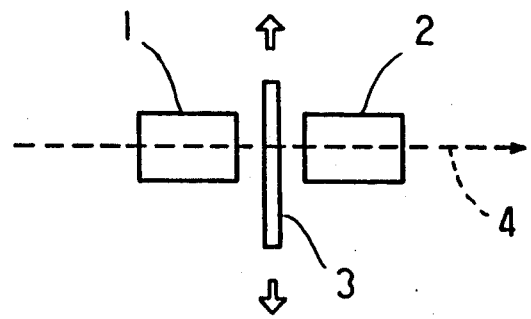
FIG. 1 is a side view of a conventional optical attenuator of the variable attenuation type, wherein a glass plate whose transmittance continuously changes with the angle of rotation is arranged in-between a pair of rod lenses.
Figure 2:
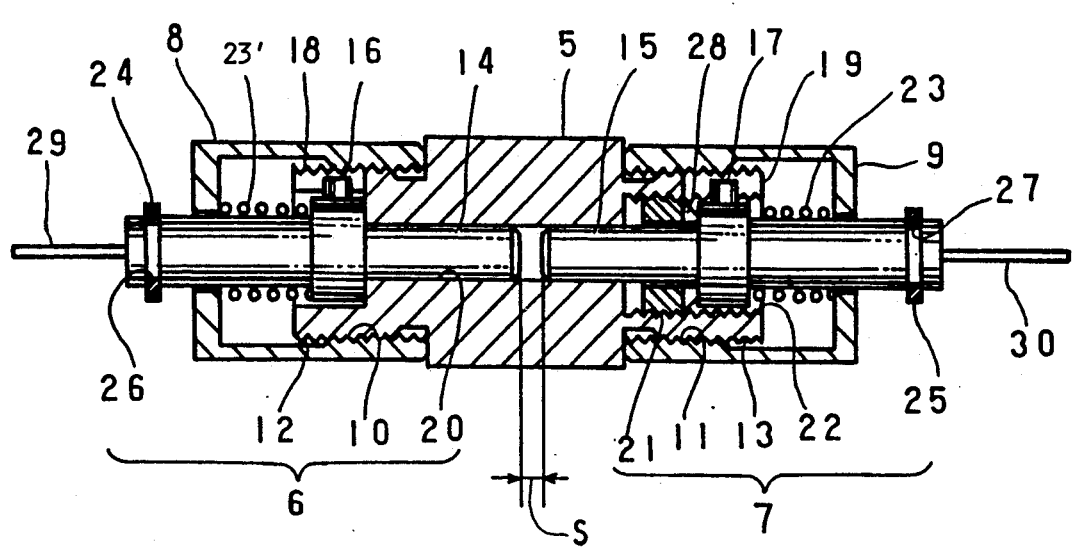
FIG. 2 is a cross-sectional view of an example of an optical attenuator which can continuously attenuate optical power in such a manner that the distance between the edges of the ferrules which mate together is changed by an adjuster in the connector structure.

The optical power attenuation for the optical power attenuator of this type wherein the ferrule edge surface is set perpendicular to the optical axis thereof (referred to as $\theta = 0°$) is shown in the dashed line of FIG. 6. Data of the dashed line was obtained from a structure such as that shown in FIG. 2.

The data in FIG. 6 implies that the attenuation increases with both "$\theta$" and "S".

The angle of the inclination of the ferrule edge surface can be determined by the attenuation range required for desired operation, referring to the data in FIG. 6.

In FIG. 7, the optical power loss caused by the reflection at the interfaces among optical power attenuators of the variable attenuation type has been given in a histogram.

A type SM-10/125 single-mode optical fiber (with a core diameter of 10 $\mu$m and with a clad diameter of 125 $\mu$m) was used. One hundred and fifty units of optical power attenuators of the variable attenuation type wherein the angle of the inclination of each ferrule edge surface was set at 12 degrees (referred to as $\theta = 12°$) were used to measure the optical power loss due to the reflection at the interfaces among the units connected in series. A laser diode with a wavelength of 13 $\mu$m was used as a light source for the measurement.

The average of the optical power loss due to the reflection at the interfaces among the units was −67.9 dB, and the standard variation thereof was 1.6 dB which was quite low with respect to the average. The optical power loss due to the reflection at the interfaces among the units was unchanged with changing angle between a pair of ferrules, wherein one is rotating around the optical axis of the ferrules and the other fastened.

As described above, the optical power attenuator of the variable attenuation type employs an optical connector structure with some variations, wherein the ferrule edge surfaces are finished by polishing the surfaces at seven to 20 degrees, depending on the optical power attenuation range, with respect to a plane perpendicular to the optical axes of the respective ferrules, one end of the first optical connector plug is inserted into the alignment adapter and fastened there, and the ferrule of the second optical connector plug is inserted into the alignment adapter, so that the ferrule of the second optical connector plug can easily be revolved manually around the optical axis thereof by an angle in the range of 0 to 180 degrees with respect to the first ferrule of the first optical connector plug. Thus, a troublesome adjustment which is carried out by repeating the attachment-/detachment of the second ferrule to/from the first ferrule is not necessary.

Since the ferrule edge surface is finished by polishing the ferrule edge surface at seven to eight degrees with respect to a plane perpendicular to the optical axis of the ferrule, the optical power loss due to the reflection at the interfaces among the optical power attenuator units will greatly be reduced.

Since the inclination of the ferrule edge surface is effective to reduce the optical power loss due to the reflection at the interfaces among the optical power attenuators, the optical power attenuator built in accordance with the present invention is composed of a pair of ferrules whose edge surfaces are finished at seven to 20 degrees with respect to the plane perpendicular to the optical axes of the ferrules. The optical power loss due to the reflection at the interfaces among the optical attenuator units is almost independent of the distance between the optical fiber edge surfaces, as shown in the histogram of FIG. 7. This type of unit can be produced in mass production facilities.

As described above, the optical power attenuator of the variable attenuation type built in accordance with the present invention has features of simple structure, easiness in adjustment, and low optical power loss. Its production cost is thus less than that of the conventional version and no limitation is imposed upon its use.

What is claimed is:

1. An optical power attenuator of the variable attentuation type, wherein optical power transmitted from an end of a first optical fiber is attenuated by a predetermined amount and then transmitted to an end of a second optical fiber coupled to said end of the first optical fiber, comprising:
   an alignment adapter having a longitudinal optical axis, said alignment adapter being provided with first and second coupling portions at respective ends thereof;
   first and second ferrules surrounded by said alignment adapter, each of said ferrules having a mating end surface for positioning adjacent the mating end surface of the other ferrule, and each of said ferrules further having a central through hole therein for receiving said first and second optical fibers respectively, the mating end surfaces of said ferrules being inclined at a predetermined angle with respect to said longitudinal axis, and said ends of the first and second optical fibers being positioned within the central holes of said first and second ferrules respectively adjacent the mating end surfaces thereof;
   first and second optical fiber connectors for attachment to the first and second coupling portions of said alignment adapter, said first and second optical fiber connectors supporting said first and second ferrules respectively for rotation about said longitudinal axis and urging the mating end surface of each ferrule into contact with the end surface of the other ferrule at at least portions thereof, the mating end surfaces of said first and second optical ferrules being parallel with each other when the relative angular displacement between said first and second ferrules is at a predetermined angle, and said mating end surfaces forming a maximum angle therebetween when said first and second ferrules have a relative angular displacement of 180° from said predetermined angle; the distance between the ends of said first and second optical fibers varying in accordance with the relative angular displacement between said first and second ferrules; and
   means for fixing said first and second ferrules to said alignment adapter at a relative rotational angle which provides said predetermined amount of attentuation.

2. An optical power attenuator of the variable attenuation type as claimed in claim 1, wherein said alignment adapter has a through hole therein and wherein said ferrules have cylindrical outer diameters, the through hole of said alignment adapter precisely mating with the outer diameters of said ferrules, whereby said ferrules are rotatable about said longitudinal axis.

3. An optical power attenuator of the variable attenuation type as claimed in claim 1, wherein said mating end surfaces are inclined at an angle greater than seven degrees with respect to a plane perpendicular to said longitudinal axis.

4. An optical power attenuator of the variable attenuation type as claimed in claim 3, where said mating surfaces are inclined an an angle between 7 and 20 degrees.

5. An optical power attenuator of the variable attenuation type as claimed in claim 1, wherein each of said optical fiber connectors comprises
   a holder for rotatably supporting its associated ferrule while preventing movement thereof along said longitudinal axis;
   a coupling nut having a hole at one end for supporting its associated holder and means for attachment at the other end thereof to a corresponding coupling portion of said alignment adapter; and
   spring means positioned between said holder and said coupling nut to force the mating end surfaces of said first and second ferrules toward each other.

* * * * *